April 14, 1925.
R. C. WEBSTER
TRACTION GRIP FOR TIRES
Filed Jan. 31, 1923
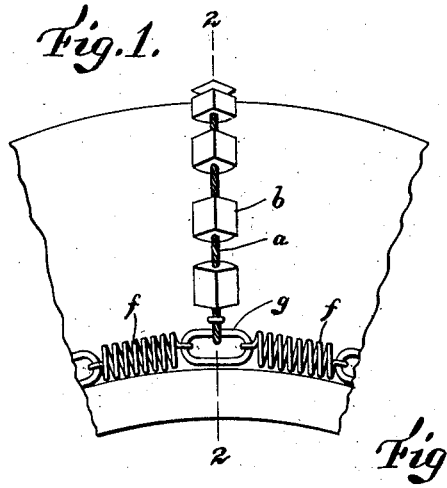
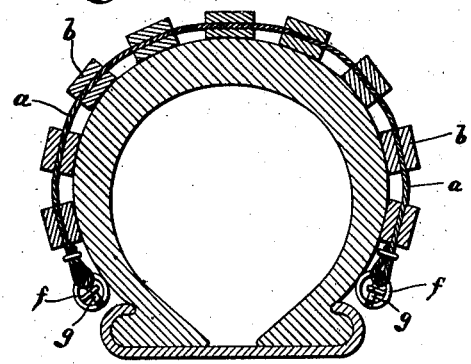
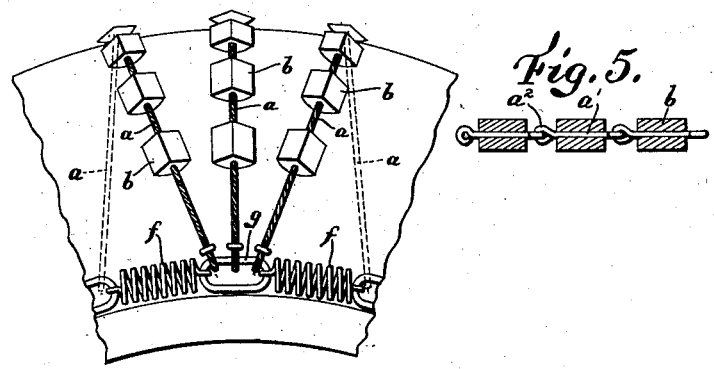
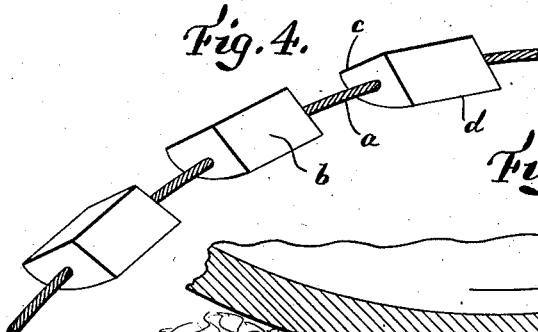
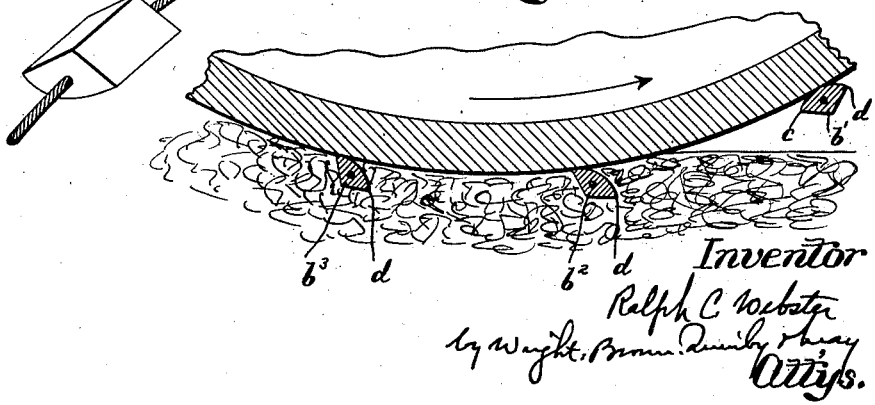
Inventor
Ralph C. Webster Patented Apr. 14, 1925.

1,533,679

UNITED STATES PATENT OFFICE.

RALPH C. WEBSTER, OF HAVERHILL, MASSACHUSETTS.

TRACTION GRIP FOR TIRES.

Application filed January 31, 1923. Serial No. 616,001.

*To all whom it may concern:*

Be it known that I, RALPH C. WEBSTER, a citizen of the United States, residing at Haverhill, in the county of Essex and State of Massachusetts, have invented new and useful Improvements in Traction Grips for Tires, of which the following is a specification.

The present invention relates to traction devices of the sort commonly known as tire chains which are applied to the tires of automobiles to prevent skidding and spinning of the wheels on wet slippery road surfaces and in mud, loose sand, snow, etc. The improved tread grip which is the subject of this invention combines efficient traction qualities on smooth and hard road surfaces with improved traction and anti-skidding qualities in soft and yielding ground, such as mud, sand, snow and the like.

In this specification, for convenience and brevity of statement, the snow covering of the ground is considered and referred to as part of the ground within the meaning of the term "ground" as here used.

The improved traction effect in such soft or yielding ground is secured by the shape and arrangement of the blocks which essentially form the traction devices, whereby they are caused in such soft ground to rock on the tire tread and thereby expose increased areas to the ground material, and whereby their tractive effect is increased.

In the drawings which illustrate the preferred and a possible modification of the invention,—

Figure 1 shows in side view a fragment of a wheel rim, equipped with a pneumatic tire such as used in automobiles, and on which one of the traction units embodying the invention is applied.

Figure 2 is a cross section of the same taken on line 2—2 of Figure 1.

Figure 3 is a view similar to Figure 1 showing, in addition, another possible mode of arranging the traction units.

Figure 4 is a perspective view of one of the traction units on a larger scale.

Figure 5 is a sectional view showing a modification in construction of one of such units.

Figure 6 is a view showing a fragment of the tread of an automobile tire, in longitudinal section, and illustrating the action of the traction device in soft ground.

Like reference characters designate the same parts wherever they occur in all the figures.

The principal characteristics of the invention are embodied in what I call a "traction unit;" and secondary characteristics are embodied in the combination of such unit with means for coupling it to a wheel so that it may yield in the manner required for the performance of its new function of obtaining increased tractive effect in soft ground.

In essentials the traction unit consists of a flexible band $a$ adapted to extend transversely around the tire, or at least across the tread portion of the tire, and on which are placed blocks $b$. Said band may be of various materials and constructions. One satisfactory form is a wire cable of twisted or braided strands; but a cable of fibrous materials instead of one made of wire may be used and so also may a single rod or strap, sufficiently flexible, strong and tough, made of metal or any other suitable material. Instead of making the band of a single continuous piece, I may make it of link construction as shown in Figure 5, consisting of short lengths $a'$ having eyes or hooks $a^2$ at their ends which are coupled and interlocked with the eyes of adjacent lengths so as to have the effect of a chain. Also chains of other and any desired construction may be used for the same end.

The blocks $b$ are placed at suitable intervals along the band $a$ or the equivalent of such band. Preferably spaces are left between the blocks so that their end surfaces may be availed of to the best purpose in preventing lateral skidding of the wheel. Said end surfaces are substantially at right angles to the outer surface of the blocks; and when the attachment is applied to a wheel, they extend abruptly away from the tread surface of the tire and across the line of movement of the wheel when it skids sidewise. These blocks may be made of any suitable material, as metal, or anything else which has sufficient strength and wearing qualities. Preferably, however, they are made of rubber composition molded and vulcanized on the band, as such compositions have great wearing qualities when made with enough resilience and are, in addition, compressible, whereby they offer less impedance to the rolling of the wheel on a hard ground surface and cause less vibration of the automobile chassis.

An important characteristic of the blocks is that their surfaces which lie next to the tire tread are convex, either with a smooth curvature as indicated in these drawings or with polygonal formation having sufficiently large angles between adjacent faces for the purposes presently set forth. These blocks also are much wider than the thickness of their substance between the band and the nearest part of the tire. Thereby the blocks are adapted to rock on the tire, as shown in Figure 6. The normal position of the blocks relative to the tire is that represented in connection with the block $b'$ in Figure 6, in which its opposite edges $c$ and $d$ are at the minimum distance from the tire tread. When the block is rocked on the tire, as shown at the positions $b^2$ and $b^3$ one or the other of these edges $c$ or $d$, according to the direction of rocking, is displaced from the tire and projects outward therefrom. When these blocks are in normal position, as above indicated, they make substantial tangent contact with the tire along the middle part of the convex inner surface. Such contacting part of the block may be considered as a protuberant narrow central portion, and the convex surface of the block at each side of said central portion constitutes an outwardly inclined portion. When the block rocks on the tire one of these inclined portions is caused to extend further and more steeply away from the tire.

When the wheel slips in soft ground, as snow, sand, mud, etc., the resistance of the ground material, entering between the edge $c$ or $d$ and the tire tread, has the effect of so rocking the block; and the result of rocking it is to increase its projection from the tire, and increase the surface which it opposes to the ground material, and thereby increase its tractive effect. In other words, the resistance of the blocks to slipping or sliding through the yielding ground material is increased. Stated in another way, if the wheel becomes embedded in ground so soft that said wheel will slip when tractive power is applied through its axle, then the blocks of the traction grip dig into the soft material and oppose increased areas to the material, whereby they tend to pack it and to increase the resistance with which such material resists slipping of the wheel; thereby increasing the tractive power of the wheel in advancing the automobile through this material. But when the wheel is rolling on hard ground, the blocks resume their normal position in which their projection from the tire is the minimum, and their resistance to the smooth travel of the wheel is also the minimum.

From what has thus been stated, it will be evident that the characteristics necessary in the tying or coupling band $a$ are sufficient flexibility to permit rocking of the blocks in the manner described, and of course sufficient strength.

Various modes of attaching the traction devices to the wheels may be used. I prefer to apply such devices as I have thus described to the wheel at frequent intervals and to connect their ends with springs $f$, $f$. When such springs are arranged between the ends of successive traction devices, they collectively form a series encircling the axis of the wheel. The two sets of springs at the respectively opposite sides of the wheel applied to secure both ends of all of the traction devices, are sufficient for that purpose and require no additional attaching means. The springs are preferably of such length and under such stress that they hold the traction grips against the tire without slack; but their elasticity enables them to yield as required to permit the rocking action of the blocks previously described.

Instead of a continuous series of springs, however, I may attach each traction grip device to the wheel in any other suitable way, provided capacity for the desired rocking motion of the blocks is retained. The ends of the bands $a$ may be connected to the springs or equivalent securing means in any desired suitable way. I have here shown the bands as having their ends doubled back and seized to form loops embracing rings $g$ to which the ends of the springs $f$ are attached; but this is a detail which may be modified in many ways which will be obvious to those acquainted with the art, without departure from the essentials of the present invention. Chains may be used in place of the springs $f$.

Various modes of disposing the traction grips may be used. That is, they may go straight across the tire in radial planes, as indicated in Figures 1 and 2, and by the middle one of the three traction grips shown in Figure 3, or they may be led in a diagonal or helical relation, with either or both directions of inclination or pitch, as indicated by the two outer grip devices shown in Figure 3. The radially and helically arranged grips may both be used on the same tire, or either arrangement alone may be used.

On their outer surfaces the blocks may have any formation desired. I have shown them here as having two broad flat faces meeting at an angle midway of their width (considering the width as the dimension transverse to the band $a$ and circumferentially of the wheel). It is part of my contemplation also, when the blocks are made of a rubber composition, to mix with the composition an abrasive or grit to resist skidding on smooth, hard, slippery road surfaces.

What I claim and desire to secure by Letters Patent is:

1. A traction grip for tires comprising essentially a block and a tying member arranged to hold said block against the outer surface of the tire, the block having a protuberant face next to the tire on which it is adapted to rock in a manner permitting movement of a side edge of the block away from the tire, whereby to increase the surface of the block opposed to soft ground material in which the tire may be embedded.

2. The combination with a wheel and its tire of a traction grip device including a member normally occupying a position near the tire and formed with a protuberant side making tangent contact with the tire between the opposite edges and about which it is adapted to be swung outward so as to project from the tire and serve as a vane to increase the tractive effect of the wheel in soft or granular material on the ground.

3. The combination with a wheel and its tire of a traction grip comprising a band extending transversely across the tread of the tire and anchored at its ends, and a block mounted on said band having side edges and an intermediate protuberant portion which projects toward the tire from the plane of said edges and about the contact of which with the tire the entire block is adapted to rock, whereby to bring one of the side edges closer to the tire and remove the opposite side edge away from the tire.

4. The combination with a wheel and its tire of a traction grip comprising a band extending transversely across the tread of the tire and anchored at its ends, and a block mounted on said band and having side edges substantially in one plane, the surface of the block next to the tire projecting from such plane and being formed to rock on the tire, whereby to bring one of the side edges closer to the tire and remove the opposite side edge away from the tire, together with yielding attaching means arranged and adapted to permit the displacement of the band incidental to such rocking movement of the block.

5. A traction grip for tires comprising a flexible band adapted to be passed across the tread of the tire transversely and to be secured at its opposite ends, and a series of blocks spaced apart on said band with spaces between them, the blocks having outer tread faces and inner rocking faces adjacent to the tire, with projecting side edges intermediate said faces.

6. A traction grip for tires comprising a flexible band adapted to be passed across the tread of the tire transversely and to be secured at its opposite ends, a series of blocks on said band with spaces between them, the blocks having outer tread faces and inner rocking faces adjacent to the tire, and resilient attaching means connected to the ends of said band and holding the traction grip close to the tire while permitting displacement of the band incidental to rocking motion of the blocks.

7. A traction grip for tires comprising a flexible band adapted to be passed across the tread of the tire transversely and to be secured at its opposite ends, and a series of blocks on said band with spaces between them, the blocks having outer tread faces and inner rocking faces adjacent to the tire, there being a succession of such traction grips placed at intervals circumferentially of the wheel, combined with attaching means for the grips consisting of springs at each side of the wheel extending in series from one grip to the next and being under tension.

8. A traction grip for tires comprising essentially a block and a tying member arranged to hold said block against the outer surface of the tire, the face of the block next to the tire being adapted to rock thereon in a manner permitting movement of a side edge of the block away from the tire, whereby to increase the surface of the block opposed to soft ground material in which the tire may be embedded, said block being of resilient vulcanized rubber composition.

9. A traction grip for tires comprising essentially a block adapted to be placed against the tread of the tire, and a tying member adapted to extend transversely across and around the tread portion of the tire for holding said block in such position, the block having on the side next to the tire a protuberant portion making contact on a narrow, approximately straight, line transverse to the tire and about which the block is adapted to rock, the block having also a side edge which is normally spaced away from the tire and which is moved still farther away by rocking of the block in one direction.

10. A traction grip for tires comprising essentially a block adapted to be placed against the tread of the tire, and a tying member adapted to extend transversely across and around the tread portion of the tire for holding said block in such position, the block having on the side next to the tire a protuberant portion making contact on a narrow, approximately straight, line transverse to the tire and about which the block is adapted to rock, the block having also side edges adapted to cut into soft ground material, one of which is moved away from the tire and the other toward the tire by rocking of the block in either direction.

11. A traction grip for tires comprising essentially a block adapted to be placed against the tread of the tire, and a tying member adapted to extend transversely across and around the tread portion of the tire for holding said block in such position, the block having on the side next to the tire a protuberant portion making contact on a narrow, approximately straight, line transverse to the tire and about which the block is adapted to rock, the block being also formed as to its outer face with a central ridge extending transversely of the tire, and with side edges adapted to dig into the ground when the lock is rocked about its line of contact with the tire.

12. A traction grip for tires comprising essentially a block and tying member engaged to hold said block against the outer surface of the tire, the side of the block next to the tire being formed with a protuberant narrow central portion and with an outwardly inclined portion at one side of said central portion; the central portion being adapted to make rocking contact with the tire, and the outwardly inclined side portion being arranged to admit soft ground material between itself and the tire when the wheel slips in such material, and thereby cause such rocking of the block as will cause the side portion to extend further and more steeply from the tire.

13. The combination with a wheel and its tire of a traction grip device including a member normally occupying a position near the tire and formed to be swung outward on its contact area with the tire so as to project therefrom and serve as a vane to increase the tractive effect of the wheel in soft or granular material on the ground, said grip device also having faces which extend abruptly from the tread surface of the tire across the directions in which the wheel moves when skidding sidewise.

14. A traction grip for tires comprising essentially a plurality of blocks and a tying member arranged to hold said blocks against the outer surface of the tire, the faces of the blocks next to the tire being adapted to rock thereon in a manner permitting movement of a side edge of the blocks away from the tire, whereby to increase the surface of the blocks opposed to soft ground material in which the tire may be embedded, said blocks being spaced apart from one another on the tying member and having end faces disposed at substantially right angles to their outer faces.

In testimony whereof I have affixed my signature.

RALPH C. WEBSTER.